Dec. 6, 1949 G. S. GEDDES 2,490,347
AUTOMATIC MOTOR VEHICLE TRANSMISSION
Filed Feb. 12, 1946 4 Sheets-Sheet 1

Inventor
George S. Geddes
By
H. Bevilsson &co.

Dec. 6, 1949     G. S. GEDDES     2,490,347
AUTOMATIC MOTOR VEHICLE TRANSMISSION
Filed Feb. 12, 1946     4 Sheets-Sheet 4

Inventor
George S. Geddes
By H. B. Willson &co.
Attorney

Patented Dec. 6, 1949

2,490,347

UNITED STATES PATENT OFFICE 2,490,347

AUTOMATIC MOTOR VEHICLE TRANSMISSION

George S. Geddes, Vandalia, Ill., assignor of one-half to Walter W. Wills, Vandalia, Ill.

Application February 12, 1946, Serial No. 647,114

19 Claims. (Cl. 74—472)

1

The invention aims to provide a comparatively simple, yet effective and reliable motor vehicle transmission which will be self-shifting from "low" to "high" and vice versa, according to the speed of the machine.

A further object is to make novel provision for preventing idle driving of the change-speed gearing while the transmission is in "high" (direct drive).

A still further object is to provide a transmission having a new and improved speed-responsive governing means for shifting from one speed to another, said governing means being free from centrifugal weights and the like.

Another object is to make novel provision whereby the transmission will be self-shifting into reverse at the will of the operator.

Yet another object is to provide relatively simple and practical control means for a self-shifting vehicle transmission, in which a single pedal is tiltable forwardly to accelerate the vehicle motor and is tiltable rearwardly to permit the transmission to "drop down" from "high."

Still another object is to provide a control means for a self-shifting vehicle transmission, in which forward tilting of a single pedal will accelerate the vehicle motor and rearward tilting of said pedal will apply the vehicle brakes.

Fig. 3 is a side elevation, partly broken away and in longitudinal section, showing the normal (car-at-rest) positions of parts.

The construction shown in the drawing will be rather specifically described but attention is invited to the possibility of making numerous variations within the scope of the invention.

A drive shaft 12 extends through a suitably sealed bearing 14 at the front end of a transmission casing 13, and a driven shaft 15 extends through a similar bearing 16 at the rear end of said casing. The drive shaft 12 may be directly connected with the flywheel of the vehicle motor without interposing a clutch, and the driven shaft 15 is ordinarily to be connected with the usual front universal of the car propeller shaft. The two shafts 12 and 15 are axially alined, and at 17 are connected for relative rotation. For these connected ends, a suitable bearing 18, in a cross brace 19, is provided; and other bearings 20 and 21, in cross braces 22 and 23, are provided between the ends of the shafts 12 and 15. Between the bearings 14 and 20, the drive shaft 12 has a yieldable section 24 to absorb shocks incident to engagement of the various clutches hereinafter described.

Figure 1:
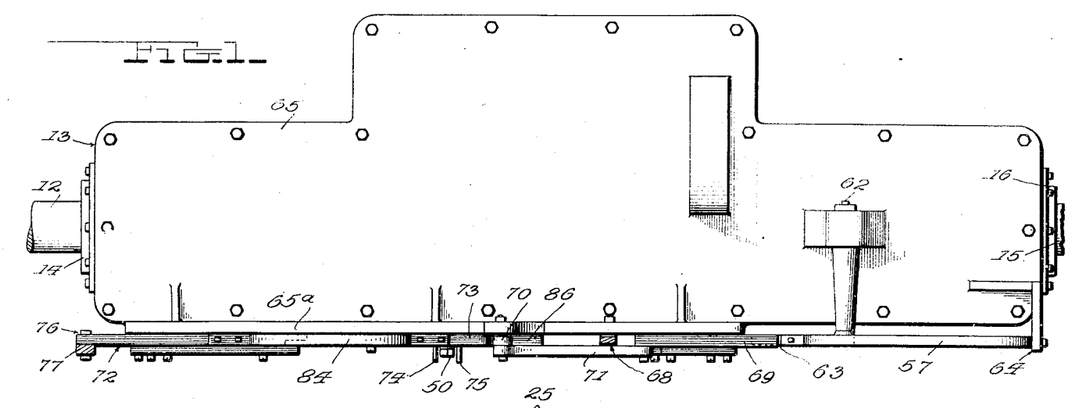
Figure 1 of the accompanying drawings, is a top plan view of the transmission, partly in horizontal section.
Figure 2:
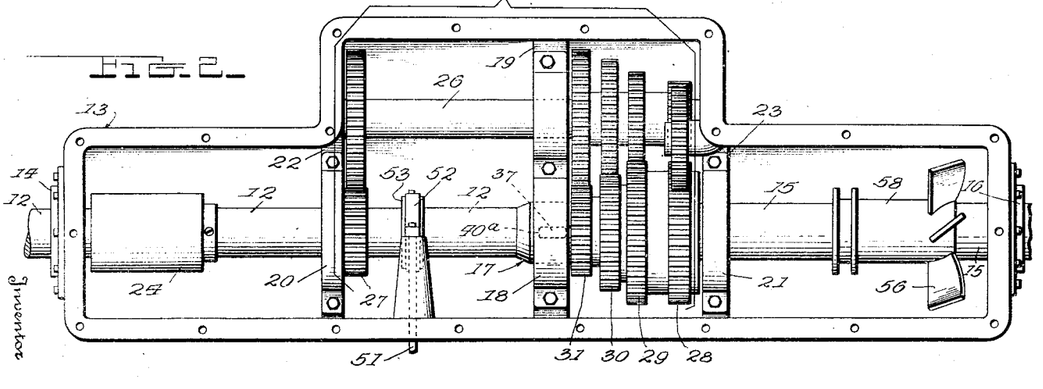
Fig. 2 is a plan view with the transmission cover and the shipper 61 removed.

Constantly meshed gearing 25 is provided for transmitting motion from the drive shaft 12 to the driven shaft 15 at different ratios of rotation, said gearing including the customary gears on a countershaft 26 (Fig. 2), a driving gear 27 loose on the drive shaft 12, and suitably spaced terminus gears 28, 29, 30 and 31 loose on the driven shaft 15. The gear 28 is a reverse-gear, 29 is a low-speed gear, 30 is a second-speed gear, and 31 is a third-speed gear.

A gearing-driving clutch 32 is provided for connecting the drive shaft 12 with and disconnecting it from the driving gear 27; different-speed clutches 33, 34 and 35 are employed for connecting the different-speed gears 29, 30 and 31 with and disconnecting them from the driven shaft 15; a reverse-clutch 36 is provided for connecting the reverse-gear 28 with said driven shaft 15 when required; and a direct-drive clutch 37 is employed for directly connecting the drive shaft 12 with said driven shaft 15 and for disconnecting it therefrom.

Figures 2, 8, 9, 10, 11:
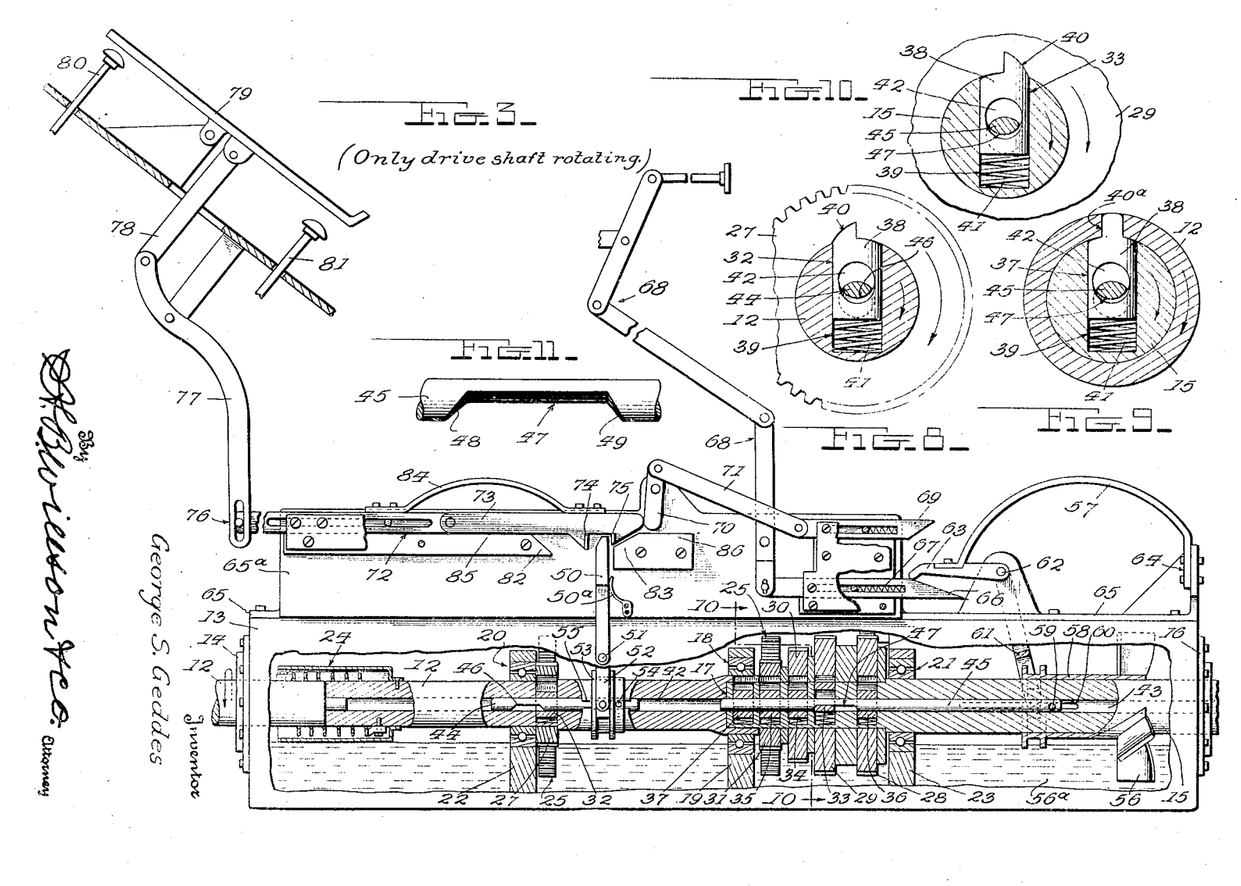
Figs. 8, 9 and 10 are enlarged transverse sections on lines 8—8, 9—9 and 10—10 of Figs. 4, 5 and 3 respectively, showing the construction of the different-speed and direct-drive clutches.
Fig. 11 is an enlarged fragmentary side elevation of a portion of the notched clutch-controlling rod 45.

Each clutch 32 to 37 comprises (see Figs. 8 to 10) a dog 38 slidable in a substantially diametrical socket 39 in the shaft 12 or 15, said dog being cooperable with a recess in the element which it is to connect with said shaft. The recesses for all of the clutches 32 to 36 and cooperating noses of the dogs 38 are of ratchet type as seen at 40 in Figs. 8 to 10; but the recess and cooperating dog nose 40ª for the direct-drive clutch 37 are of non-ratchet design as seen in Fig. 9, preventing any "free wheeling" action. Each socket 39 has a closed end and an open end, and a spring 41 is seated in said closed end for projecting the dog 38 to clutch-in position when permitted to do so. Each dog 38 has an opening 38a for alinement with axial bores 42 and 43 in the shafts 12 and 15 when said dog is retracted to clutch-out position.

One control means is provided for the gearing-driving clutch 32, said control means including a short rod 44 slidable in the bore 42 of the drive shaft 12, and another control means is provided for the clutches 33 to 37, said other control means including a long rod 45 slidable in the bore 43 of the driven shaft 15. The rod 44 extends through the dog opening 38a of the clutch 32, and the rod 45 extends through the dog openings 38a of all of the clutches 33 to 37. The rod 44 has a clutch-controlling notch 46, and rod 45 has a similar notch 47. The front end wall of the notch 47 (see Fig. 11), constitutes a dog-retracting cam 48, and a similar cam 49 is formed by the rear end wall of said notch 47. The notch 46 of the rod 44 is substantially the same as the notch 47 of rod 45, but the latter notch is longer in the present disclosure.

Figures 4, 5:
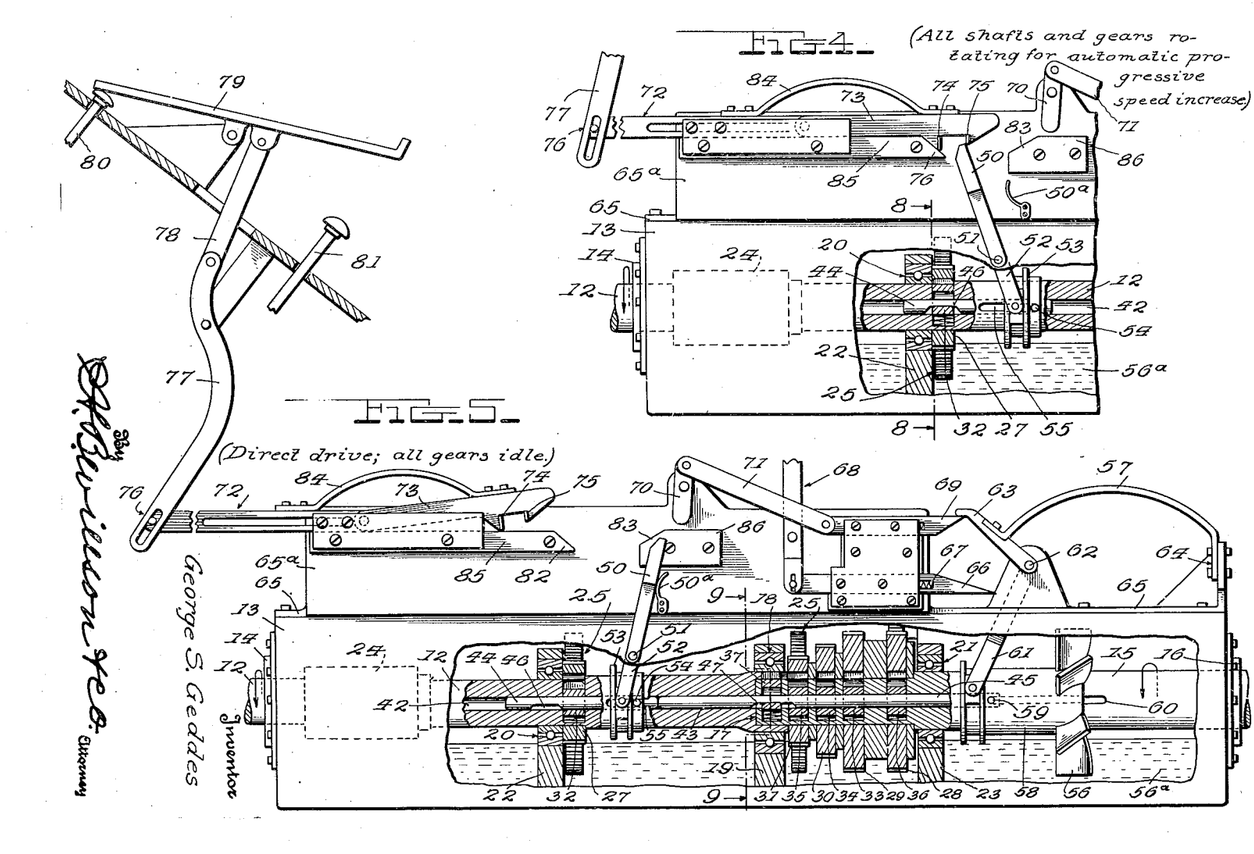
Fig. 4 is a fragmentary view similar to Fig. 3, but showing how the gearing-driving clutch 32 is engaged.
Fig. 5 is a view similar to Fig. 3 but showing all parts in their direct-drive positions.

The notch 46 of rod 44, frees the dog 38 of the gearing-driving clutch 32 when said rod 44 is shifted from the transmission-idle position of Fig. 3 to the transmission-operating position of Fig. 4, and consequently this latter position of said rod 44 allows said dog 38 of clutch 32 to engage the driving gear 27 of the gearing 25, thus causing the drive shaft 12 to drive all of said gearing 25 to rotate the terminus gears 29, 30 and 31 at different speeds in one direction, and to reversely rotate the reverse gear 28. Whenever rod 44 is shifted back to the position of Fig. 3, it again retracts the dog 38 of clutch 32 and disconnects gear 27 from the drive shaft 12 to discontinue driving of the gearing 25.

The notch 47 of the long rod 45, is cooperable with the dogs 38 of the clutches 33 to 37 in the same manner that notch 46 of rod 44 is cooperable with dog 38 of the gearing-driving clutch 32. When the transmission is idle, rod 45 occupies the rearward position of Fig. 3 and its notch 47 insures that the low-speed clutch 33 shall then be engaged while the rest of the clutches 34 to 37 are held disengaged by said rod 45, as seen in said Fig. 3. When this rod 45 is shifted forwardly from its Fig. 3 position, the second-speed clutch 34 and the third-speed clutch 35 are successively thrown in, and extreme forward movement of said rod 45 causes engagement of the direct-drive clutch 37 (see Fig. 5). As rod 45 reaches this direct-drive position, it forwardly pushes rod 34 from its clutch-in position (Fig. 4) to the extreme clutch-out position of Fig. 5. Thus, when the gearing 25 has performed its duty of progressively driving the driven shaft 15 faster and faster, and the direct-drive clutch 37 has been engaged, the gearing-driving clutch 32 is thrown-out, and as all of the clutches 33 to 36 are then held disengaged by rod 45, none of the gearing 25 will be driven, preventing wear, resistance, and possible noise while the transmission is in "high" (direct drive).

Figures 6, 7:
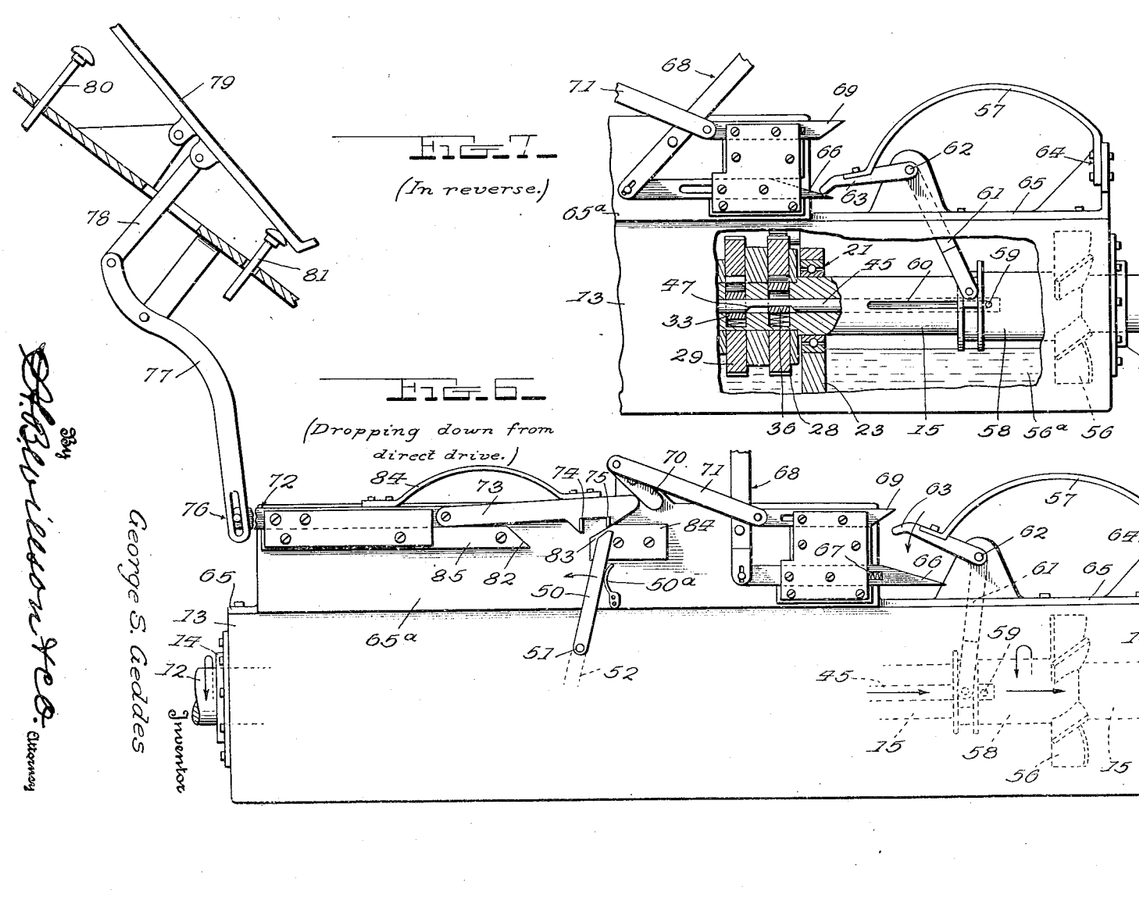
Fig. 6 is a side elevation showing how the transmission "drops down" from direct-drive.
Fig. 7 is a fragmentary side elevation, partly broken away and in section, showing how the transmission shifts into reverse.

When rod 45 is shifted rearwardly to the position of Fig. 7, the reverse-clutch 36 connects the reverse gear 28 with the driven shaft 15.

The above mentioned control means for the gearing-driving clutch 32, in addition to including the short rod 44 as above explained, includes a control member 50 disposed externally of the transmission casing 13, and means operatively connecting said control member 50 with said rod 44. In the present disclosure, the control member 50 is in the form of an upstanding arm on a rock shaft 51, said rock shaft having a shipper 52 suitably connected with a collar 53, said collar being slidable on the drive shaft 12 and being secured by means of a pin 54 to said rod 44, said drive shaft being slotted at 55 to accommodate said pin. When the transmission is idle (Fig. 3), the control member 50 occupies the normal position shown in this view and the gearing-driving clutch 32 is then disengaged so that rotation of the drive shaft 12 will perform no work. However, when the control member 50 is moved forwardly to the position of Fig. 4, it effects throwing-in or engagement of the clutch 32, and the rotating drive shaft then drives all of the gearing 25 in readiness for progressively driving the driven shaft 15 faster and faster as the different speed clutches are successively thrown in. After the direct-drive clutch 37 engages, it will be recalled that rod 45 pushes rod 44 forwardly to an extreme clutch-out position (Fig. 5), and when this occurs, the control member 50 moves rearwardly past its normal clutch-out position (Fig. 3) to the extreme clutch-out position of Fig. 5. Here it tensions a spring 50a, later effective to return it to the normal position of Fig. 3.

The control means for the clutches 33 to 37 includes not only the rod 45, but includes a speed-responsive governor 56 connected with the rear end of said rod 45 for shifting it in speed-increasing direction (forwardly), and also includes spring means 57 constantly urging said rod 45 in speed-reducing direction (rearwardly). The governor is in the form of a pitched propeller driven by the driven shaft 15 and operable in oil or other suitable fluid 56a in the transmission casing 13, said propeller being pitched in a direction to push the rod 45 forwardly when said shaft 15 attains sufficient predetermined speed to give the propeller the required bite on the fluid, said speed being preferably that at which shaft 15 drives the vehicle at about ten miles per hour. As speed is increased above said predetermined speed, the propeller exerts a progressively stronger forward force on the rod 45, and at any speed below said predetermined speed, the propeller simply slips in the fluid and will not overcome the action of the spring 57. The action of this spring 57 is normally limited to permit it to rearwardly shift rod 45 only to the low-speed position of Fig. 3, but when permitted to do so, said spring will further shift said rod (Fig. 7) to engage the reverse-clutch 36. This may be more readily understood after a description of elements associated with the propeller 56 and spring 57.

In the present disclosure, the propeller 56 has a hub 58 slidable on the driven shaft 15 and connected with rod 45 by means of a pin 59, said shaft 15 being slotted at 60 to accommodate said pin. A shipper 61 is suitably connected with the hub 58 and is carried by a rock shaft 62, said rock shaft having a forwardly projecting arm 63 over one side of the transmission casing 13. In the present showing, the spring 57 acts on this arm 63 and is anchored at 64 to the transmission cover 65. A slidably mounted cam 66 underlies the arm 63 and normally prevents this arm from swinging downwardly to transmission-reversing position (Fig. 7). However, when this cam 66 is moved forwardly as in Fig. 7, it permits the spring 57 to effect shifting of rod 45 to reversing position. A spring 67 is provided for yieldably holding the cam 66 in its normal position, and suitable manually operable means 68 is employed to move said cam to its Fig. 7 position (in-reverse). The means 68 is also operable to forcibly move cam 66 back to its normal position to shift the transmission out of reverse.

A slidable latch 69 is cooperable with the arm 63 to latch this arm and rod 45 in direct-drive position, said latch being spring-projected and beveled to allow arm 63 to retract said latch during ascent and to then cause projection of said latch under said arm as seen in Fig. 5. A releasing lever 70 is provided for latch 69, said lever being linked at 71 to said latch and being operable in a manner hereinafter described.

A forwardly and rearwardly slidable actuator 72 is provided for moving the control member 50 from its normal clutch-out position (Fig. 3), to its clutch-in position (Fig. 4), when said actuator is moved forwardly from the car-idle position of said Fig. 3, and for actuating the releasing lever 70 of latch 69 (see Fig. 6) when said actuator 72 is moved rearwardly from said car idle position. The actuator 72 includes an upwardly swingable rear section or hook 73 to engage the upper end of the control member 50 when all parts are in normal car-idle position (Fig. 3). In the present showing, the hook 73 has one bill 74 normally in front of member 50 and a second bill 75 normally behind said member 50. The actuator 72 is connected at 76 to a bell crank 77, and this bell crank is linked at 78 to a pivoted pedal 79. Movements of this pedal 79 not only operate the actuator 72, but foward tilting of said pedal (Fig. 5) operates the vehicle motor accelerator 80, and rearward tilting of said actuator (Fig. 6) operates a vehicle brake actuator 81. Upon forward movement of the actuator 72 from its car-idle position of Fig. 3, bill 75 pulls control member 50 to the clutch-in position of Fig. 4 and consequently the clutch 32 then drives the gearing 25 to drive the driven shaft 15. As soon as this movement has occurred, hook 73 is lifted from engagement with the member 50 (Fig. 4) by means of a stationary cam 82, and said member will not then interfere with further forward movement of the actuator 72 incident to car acceleration. If, after starting the car, it must be slowed or stopped before the member 50 is restored to clutch-out position (by 45 pushing on 44), the rearward movement of the actuator 72 incident to "letting up on the gas" and brake-application, will cause hook bill 74 to ride down the cam 82 and said bill 74 will then push member 50 from its clutch-in position (Fig. 4) back past its normal clutch-out position (Fig. 3) to the extreme rear clutch-out position of Figs. 5 and 6. Also, when the transmission is in direct-drive (Fig. 5), the control member 50 always occupies this extreme rearward position, and in this position, it must not interfere with rearward movement of the actuator 72 for brake application (Fig. 6), or for release of latch 69 (Fig. 6) when it is desired to "drop down" from direct drive (Fig. 6). Therefore, a second stationary cam 83 is provided to coact with the hook bill 75 and lift the hook 73 clear of said member 50, as seen in Fig. 6, whenever said member 50 occupies its Figs. 5 and 6 position and rearward movement of the actuator 72 is required. A suitable spring 84 is provided exerting a downward force on hook 73 to prevent it from accidentally swinging out of its proper relation with other elements. A track 85 is shown along which this hook 73 slides during car driving, after it is lifted by cam 82, and another track 86 supports said hook during its rearward movement after it has been lifted by cam 83.

The parts 57, 62, 63, 66, 69, 70 and 72 are preferably all mounted on a flange 65ª projecting upwardly from the transmission cover 65 and are, therefore, bodily removable with said cover.

*Operations required in starting from a standstill and progressively shifting to direct-drive*

Whenever the car, equipped with the transmission, is standing idle, all parts occupy the positions shown in Fig. 3, with all clutches except the low-speed clutch 33 disengaged, and with said low-speed clutch engaged in readiness for driving the driven shaft 15. Starting of the motor now causes rotation of the drive shaft 12 and as long as the motor is idling, the transmission parts remain in said Fig. 3 positions and the transmission, therefore, remains idle. When it is desired to propel the car, the operator simply tilts the pedal 79 forwardly. This accelerates the motor and shifts the actuator 72 forwardly (Fig. 4), causing said actuator 72 to shift the control member 50 to the clutch-in position of Fig. 4. Consequently, the gearing-driving clutch 32 is thrown-in (Fig. 4) and the gearing 25 is driven. As the low-speed clutch 33 is already engaged, the low-speed gear 29 will drive the shaft 15, propelling the car and driving the propeller 56. At first, this propeller simply slips in the fluid 56ª but by the time the driven shaft 15 is rotating sufficiently fast to drive the car at a predetermined speed (preferably about ten miles per hour), said propeller has sufficient bite on said fluid 56ª to start moving forwardly through said fluid against the resistance of the spring 57, and as car speed increases, accompanied by propeller speed increase, said propeller exerts a stronger and stronger forward force on rod 45. The forward movement of the propeller 56 slides the rod 45 forwardly and this rod movement throws-out the low-speed clutch 33 and effects engagement of the second-speed clutch 34, then throws-out said second-speed clutch 34 and causes engagement of the third-speed clutch 35, and finally throws-out said third-speed clutch 35 and effects engagement of the direct-drive clutch 37. As rod 45 causes engagement of this direct-drive clutch 37, said rod 45 pushes the short rod 44 forwardly to the clutch-out position of Fig. 5, thereby disengaging the gearing-driving clutch 32 and arresting all driving of the gearing 25. The forward shifting of rod 44, just described, shifts the control member 50 to the position of Fig. 5 and tensions the spring 50a. Also, the final forward movement of the rod 45 causes the arm 63, which ascends against the action of spring 57 as said rod 45 moves forwardly, to engage the latch 69 (Fig. 5). The transmission is thus latched "in high" and cannot shift "out of high" until the driver wishes to "drop down."

*Dropping down from direct-drive*

When the car speed decreases sufficiently to make "dropping down" from direct-drive advisable, the pedal 79 is tilted rearwardly (Fig. 6) and then immediately returned to the normal position (Fig. 3). This tilting causes the actuator 72 to move rearwardly and its hook 73 operates the lever 70, thereby releasing the latch 69 and freeing the arm 63. During this latch-releasing movement of the actuator 72, its hook 73 is lifted to clear the control member 50, by means of the cam 83 (see Fig. 6). As soon as the arm 63 is freed, if the car speed be then sufficiently slow, the propeller 56 has insufficient bite on the fluid 58 to overcome the action of the spring 57. Therefore, this spring 57 causes rearward sliding of the rod 45 toward low-speed position to the point at which the forward pull of the propeller balances the action of said spring, automatically connecting the proper one of the low-speed gears (29 to 31) with the driven shaft, according to the vehicle speed. The just-described rearward movement of rod 45, is accompanied by rearward movement of rod 44 from its Figs. 5 and 6 position, under the influence of the spring 50ª, until said rod 44 reaches the normal position of Fig. 3. During this rearward movement of rod 44, the control member 50 moves forwardly and "clicks" under the rear hook bill 75. Remember here that return of pedal 79 to its Fig. 3 position immediately after release of latch 69, was necessarily accompanied by return of hook 73 to the position of Fig. 3, making it possible for the control member 50 to "click" under bill 75 and occupy its normal position between the two bills 74 and 75. Now, when the operator tilts pedal 79 forwardly to again accelerate the car motor, the hook 73 again moves forwardly, again moving control member 50 forwardly to re-engage the gearing-driving clutch 32. Thus, the gearing 25 is driven, one gear or another drives the shaft 15, and "dropping down" from direct-drive is accomplished. Now, if vehicle speed be increased, the transmission will again automatically adjust itself according to car speed, as will be clear from the above.

*Brake application*

Rearward tilting of the pedal 79 beyond the position in which it causes release of latch 69, so operates the brake actuator 81 as to apply the vehicle brakes. When this pedal-tilting is performed, if the transmission be in any setting except direct-drive, the control member 50 will stand as seen in Fig. 4. Consequently, the rearward movement of the hook 73 incident to said pedal tilting will cause the bill 74 to ride down the cam 82 and push said member 50 back to the position of Figs. 5 and 6, in which position the gearing-driving clutch 32 is thrown-out. As soon as the hook 73 is released from member 50 by the cam 83 during brake application, the spring 50ª restores said member 50 to its Fig. 3 position, in which the gearing-driving clutch 32 is still held disengaged. If the car be stopped by the above mentioned brake application, control member 50 will remain in this clutch-out position, but if the car is to proceed, the forward tilting of the pedal 79 for motor acceleration will again cause the hook 73 to forwardly move said member 50 to effect re-engagement of the gearing-driving clutch 32.

When brake application is effected while the transmission is in direct-drive, the rearward movement of the actuator 72 incident to such application, effects release of the latch 69 holding the arm 63, and if the car speed be decreased sufficiently to allow spring 57 to overcome the forward action of propeller 56, said spring 57 will then rearwardly slide the rod 45 and set the transmission according to the car speed. If the car speed be not reduced this much, the rod 45 will not be moved by spring 57 upon release of latch 69, the transmission will remain in direct-drive, and upon brake release said latch will simply re-engage the arm 63. If, while in direct-drive, the car be stopped by brake application, the transmission will automatically reset to normal (Fig. 3) as above described in "dropping-down" from direct-drive.

From the foregoing and the accompanying drawings, it will be seen that novel and advantageous provision has been made for attaining the desired ends. While preferences have been disclosed, attention is again invited to the possibility of making variations within the scope of the invention as claimed. Moreover, while such terms as "forwardly" and "rearwardly" have been used herein for more concise description, and these terms are strictly applicable in the great majority of installations (transmission extending longitudinally of vehicle), said terms are not to be considered as excluding installations in which the transmission extends transversely of the vehicle.

I claim:

1. In a transmission mechanism in which a direct-drive clutch is provided for directly connecting a drive shaft with an alined driven shaft, and in which gearing is driven by said drive shaft for driving said driven shaft prior to engagement of said direct-drive clutch; a gearing-driving clutch for connecting the initial gear of said gearing with and disconnecting it from said drive shaft, and controlling means for said gearing-driving clutch, including means for holding said gearing-driving clutch disengaged when the transmission is in low gear, to delay transmission operation until desired, and means for causing engagement of said gearing-driving clutch at the desired moment.

2. In a transmission mechanism in which a direct-drive clutch is provided for directly connecting a drive shaft with an alined driven shaft, and in which gearing is driven by said drive shaft for driving said driven shaft prior to engagement of said direct-drive clutch; a gearing-driving clutch for connecting the initial gear of said gearing with and disconnecting it from said drive shaft, and controlling means for automatically disengaging said gearing-driving clutch upon engagement of said direct-drive clutch, said controlling means including means for holding said gearing-driving clutch disengaged when the transmission is in low gear, to delay transmission operation until desired, and means for causing engagement of said gearing-driving clutch at the desired moment.

3. A transmission mechanism comprising a drive shaft and a driven shaft axially alined and mounted for relative rotation; constantly meshed gearing for transmitting motion from said drive shaft to said driven shaft, including a drive gear coaxial with said drive shaft, and different-speed gears coaxial with and rotatable with respect to said driven shaft; a gearing-driving clutch for connecting said drive shaft with said drive gear; different-speed clutches for progressively connecting said different-speed gears one at a time with said driven shaft; a direct-drive clutch for directly connecting said drive shaft with said driven shaft; and controlling means for said clutches, including means for progressively throwing in said different-speed clutches and finally said direct-drive clutch, and means for throwing out said gearing-driving clutch upon throwing-in of said direct-drive clutch; whereby none of said gearing will be driven while the transmission is in direct drive, said controlling means also including means for throwing out said gearing-driving clutch when the low-speed clutch is engaged, to delay transmission operation until desired, and means whereby said gearing-driving clutch may be thrown in at the desired moment.

4. A transmission mechanism comprising a drive shaft and a driven shaft axially alined and mounted for relative rotation; constantly meshed gearing for transmitting motion from said drive shaft to said driven shaft, including a drive gear coaxial with said drive shaft, and different-speed gears coaxial with and rotatable with respect to said driven shaft; a gearing-driving clutch for connecting said drive shaft with said drive gear; different-speed clutches for progressively connecting said different-speed gears one at a time with said driven shaft; a direct-drive clutch for directly connecting said drive shaft with said driven shaft; one controlling means for said different-speed clutches and said direct-drive clutch operative to successively engage said different-speed clutches and to then engage said direct-drive clutch; and additional controlling means for said gearing-driving clutch; said two controlling means having cooperative portions effective to disengage said gearing-driving clutch when said direct-drive clutch is engaged, whereby said gearing will not be driven while said direct-drive clutch is engaged, said additional controlling means including means for throwing-out said gearing-driving clutch when the low-speed clutch is engaged, to delay transmission operation until desired, and means for operating said additional controlling means independently of said one controlling means to throw-in said gearing-driving clutch at the desired moment.

5. A transmission mechanism comprising a drive shaft and a driven shaft axially alined and mounted for relative rotation; constantly meshed gearing for transmitting motion from said drive shaft to said driven shaft, including a drive gear coaxial with said drive shaft, and different-speed gears coaxial with and rotatable with respect to said driven shaft; a gearing-driving clutch for connecting said drive shaft and said drive gear; different-speed clutches for progressively connecting said different-speed gears one at a time with said driven shaft; a direct-drive clutch for directly connecting said drive shaft with said driven shaft; one clutch-control rod slidable longitudinally of said drive shaft for engaging said gearing-driving clutch when said one rod is moved rearwardly and for disengaging said gearing-drive clutch when said one rod is moved forwardly; means for rearwardly moving said one rod to engage said gearing-driving clutch; a second clutch-control rod slidable longitudinally of said driven shaft for successively engaging said different-speed clutches and said direct-drive clutch as said second rod is moved forwardly, and for disengaging all but the low-speed clutch as said second rod is moved rearwardly; and means for forwardly and rearwardly sliding said second rod; said two rods being so related that said second rod will push said one rod forwardly to clutch-out position when said second rod is moved forwardly to its direct-drive-clutch-in-position.

6. In a variable speed motor-driven transmission including shiftable means for setting said transmission for different speeds, an axially shiftable pitched propeller connected with said shiftable means, a casing containing said propeller, a liquid in said casing in which said propeller is operable, said propeller being pitched in a direction to cause it to effect speed-increasing movement of said shiftable means when the speed of said propeller is sufficient to give it predetermined thrust on said liquid, and spring means so connected with said shiftable means as to be stressed for action by the speed-increasing movement of said shiftable means, whereby said spring means will effect speed-decreasing movement of said shiftable means when decreased speed of said propeller gives it insufficient thrust on said liquid to overcome the action of said spring means.

7. In a variable speed transmission including a rotatable drive shaft, a rotatable driven shaft, gearing for transmitting rotary motion from said drive shaft to said driven shaft at predetermined gear ratios, certain gears of said gearing constituting controlling gears and having clutches associated with them, the clutches being movable from an inoperative position to an operative position, and an adjusting member for said clutches shiftable longitudinally in one direction for successively moving the clutches to an operative position and thereby progressively changing the gear ratio in an upward direction, the clutch adjusting member when moved longitudinally in an opposite direction successively causing the clutches to move to an operative position and thereby progressively changing the gear ratio in a downward direction; a pitched propeller driven by said transmission and mounted for axial shifting, said propeller being operatively connected with said control member and being cooperable with a fluid to shift said control member in speed-increasing direction, and means for shifting said control member in speed-reducing direction.

8. In a variable speed transmission, a rotatable drive shaft, a rotatable driven shaft, gearing for transmitting rotary motion from said drive shaft to said driven shaft including ratio-controlling gears carried by said driven shaft and having clutches associated with them and movable from an inoperative position to an operative position, a clutch-operative rod slidable longitudinally in said driven shaft and adapted to successively move the clutches in an operative position when shifted longitudinally in one direction and thereby progressively change the gear ratio to an upward direction, said rod when shifted longitudinally in an opposite direction successively causing movement of the clutches to an inoperative position and progressively changing the gear ratio in a downward direction; a sleeve slidable longitudinally on said driven shaft, a pin extending transversely through said sleeve, shaft and rod; said shaft being longitudinally slotted to prevent said pin from interfering with unitary forward and rearward movement of said sleeve and rod, a pitched propeller blade on said sleeve and cooperable with a fluid to shift said sleeve and rod in speed-increasing direction, and means including a shipper connected with said sleeve for shifting said sleeve and rod in speed-reducing direction.

9. A structure as specified in claim 6; said means for shifting said clutch-adjusting member in said gear ratio reducing direction including a spring constantly urging said clutch adjusting member in this direction.

10. A structure as specified in claim 7; said means for shifting said sleeve and rod in said gear ratio reducing direction including a spring constantly urging said rod and sleeve in this direction.

11. A structure as specified in claim 6; said means for shifting said clutch operating member in said gear ratio reducing direction including a spring constantly urging said clutch operating member in this direction; said clutch operating member being shiftable to a driven-shaft-reversing-position under the influence of said spring, and manually controlled means for normally prohibiting movement of said clutch operating member to this reversing position and for shifting it from this position when reversing is to be terminated.

12. In a variable speed transmission, a rotatable drive shaft, a rotatable driven shaft, gearing for transmitting rotary motion from said drive shaft to said driven shaft including ratio controlling gears carried by said driven shaft and having clutches associated with them and movable from an inoperative position to an operative position, a clutch operating rod slidable longitudinally in said driven shaft and adapted to successively move the clutches to an operative position when shifted in one direction and thereby progressively change the gear ratio in an upward direction, said rod when shifted longitudinally in an opposite direction successively causing movement of the clutches in an operative position and progressively changing the gear ratio in a downward direction, a sleeve slidable longitudinally on said driven shaft, a pin extending transversely through said sleeve, shaft and rod, said shaft being longitudinally slotted to prevent said pin from interfering with unitary forward and rearward movement of said sleeve and rod, a pitched propeller blade on said sleeve and cooperable with a fluid to shift said sleeve and rod in speed-increasing direction, a pivoted shipper connected with said sleeve and having an arm, said shipper and its arm moving as said rod and sleeve move, spring means constantly urging said rod and sleeve in speed-reducing direction, said rod and sleeve being shiftable also to a driven-shaft-reversing-position under the influence of said spring means, a movably mounted cam cooperable with the aforesaid arm to normally prevent movement of said rod and sleeve to said reversing position and to return said rod and sleeve from this position, and operating means for said cam.

13. A transmission mechanism comprising a drive shaft and a driven shaft in axial alinement and mounted for relative rotation; constantly meshed gearing for transmitting motion from said drive shaft to said driven shaft, including a drive gear coaxial with said drive shaft, and different-speed gears coaxial with and rotatable with respect to said driven shaft; a gearing-driving clutch for connecting said drive shaft with said drive gear; different-speed clutches for connecting said different-speed gears successively with said driven shaft; a direct-drive clutch for connecting said drive shaft directly with said driven shaft; clutch-controlling means for said gearing-driving clutch including a control member movable in one direction from a normal clutch-out position to a clutch-in position; additional clutch-controlling means for controlling said different-speed clutches and said direct-drive clutch, including a shiftable member movable in one direction from a low-speed position to a direct-drive position; speed-responsive means driven by said driven shaft for shifting said shiftable member in said one direction, and means constantly urging said shiftable member back toward said low-speed position; said two clutch-controlling means having cooperable portions effective to throw out said gearing-driving clutch when said direct-drive clutch is thrown in; latch means for holding said shiftable member against return when it reaches said direct-drive position, and manually operable control means for the first mentioned control member and said latch means.

14. A transmission mechanism comprising a drive shaft and a driven shaft in axial alinement and mounted for relative rotation; constantly meshed gearing for transmitting motion from said drive shaft to said driven shaft, including a drive gear coaxial with said drive shaft, and different-speed gears coaxial with and rotatable with respect to said driven shaft; a gearing-driving clutch for connecting said drive shaft with said drive gear; different-speed clutches for connecting said different-speed gears successively with said driven shaft; a direct-drive clutch for connecting said drive shaft directly with said driven shaft; clutch-controlling means for said gearing-driving clutch including a control member movable in one direction from a normal clutch-out position to a clutch-in position; additional clutch-controlling means for controlling said different-speed clutches and said direct-drive clutch, including a shiftable member movable in one direction from a low-speed position to a direct-drive position; speed-responsive means driven by said driven shaft for shifting said shiftable member in said one direction, and means constantly urging said shiftable member back toward said low-speed position, said two clutch-controlling means having cooperable portions effective to throw out said gearing-driving clutch when said direct-drive clutch is thrown in; latch means for holding said shiftable member against return when it reaches said direct-drive position; and manually operable master control means including an actuator for moving the first mentioned control member to said clutch-in position when said actuator is moved in one direction from a normal position and for releasing said latch means when said actuator is moved in the other direction from said normal position.

15. A transmission mechanism comprising a drive shaft and a driven shaft in axial alinement and mounted for relative rotation; constantly meshed gearing for transmitting motion from said drive shaft to said driven shaft, including a drive gear coaxial with said drive shaft, and different-speed gears and a reverse gear coaxial with and rotatable with respect to said driven shaft; a gear-driving clutch for connecting said drive shaft with said drive gear; different-speed clutches and a reverse-gear clutch for connecting said different-speed gears and said reverse gear with said driven shaft; a direct-drive clutch for directly connecting said drive shaft with said driven shaft; controlling means for said clutches including a shiftable member movable in one direction from a low-speed-position to a direct-drive-position, and movable in the other direction from said low-speed-position to a reverse-position, speed-responsive means driven by said driven shaft for shifting said shiftable member in said one direction, and means constantly urging said shiftable member in the other direction toward said reverse-position; and manually releasable means for prohibiting movement of said shiftable member to said reverse-position until said manually releasable means is released and for returning said shiftable member from said reverse-position.

16. In a transmission having an initial-clutch and speed-changing clutches; and control means for said clutches, including one control member for said initial-clutch movable from a normal clutch-out position to a forward clutch-in position and later movable to an extreme rearward clutch-out position; said control means also including a second control member for said speed-changing clutches movable from a normal low-speed position to a high-speed position; and latch means for holding said second control member in its high speed position: a forwardly and rearwardly slidable actuator including a rearwardly projecting upwardly swingable hook engaging said one control member when the latter and said actuator occupy a normal transmission-idle position, whereby forward movement of said actuator will cause said hook to pull said one control member forwardly to said forward clutch-in position; cam means for then lifting said hook from said one control member to permit further forward movement of said actuator without affecting the transmission and later permitting movement of said one control member to said extreme rearward clutch-out position; a releasing member for the aforesaid latch means mounted in position to be struck by said hook when said actuator is moved to an abnormal rear position; and cam means for lifting said hook clear of said one control member as said hook is moved to said abnormal rearward position.

17. A structure as specified in claim 16; together with a pedal connected to said actuator, said pedal being tiltable forwardly to forwardly move said actuator and tiltable rearwardly to rearwardly move said actuator.

18. In a motor vehicle transmission having speed-responsive-means for establishing different ratios of rotation between a motor-driven drive shaft and a vehicle-wheel driving shaft according to the speed of the vehicle, and means for holding the transmission in "high"; control means for said transmission including a single pivoted pedal tiltable forwardly by foot pressure for vehicle motor acceleration and also tiltable rearwardly by foot pressure, and means independent of the action of said speed-responsive-means and actuated by said rearward tilting of said pedal for releasing said holding means and thus condition the transmission to "drop down" from "high" under action of said speed responsive means.

19. In a motor vehicle transmission having speed-responsive-means for establishing different ratios of rotation between a motor-driven drive shaft and a vehicle-wheel driving shaft according to the speed of the vehicle; a single pivoted pedal tiltable forwardly for vehicle motor acceleration and tiltable rearwardly for vehicle brake application, and means actuated by said pedal for conditioning said transmission for action by said speed responsive means.

GEORGE S. GEDDES.

REFERENCES CITED

The following references are of record in the file of this patent:

UNITED STATES PATENTS

| Number | Name | Date |
|---|---|---|
| 45,522 | Rich | Dec. 20, 1864 |
| 1,068,097 | Benjamin | July 22, 1913 |
| 1,342,920 | Medley | June 8, 1920 |
| 1,472,077 | Lockwood | Oct. 30, 1923 |
| 2,102,586 | Coates | Dec. 21, 1937 |

FOREIGN PATENTS

| Number | Country | Date |
|---|---|---|
| 160,315 | Great Britain | Mar. 24, 1921 |